(12) United States Patent
Hood

(10) Patent No.: US 8,017,279 B2
(45) Date of Patent: Sep. 13, 2011

(54) FUEL CELL FLUID DISTRIBUTION PLATES

(75) Inventor: Peter David Hood, Leicester (GB)

(73) Assignee: Intelligent Energy Limited, Kent (GB)

( * ) Notice: Subject to any disclaimer, the term of this patent is extended or adjusted under 35 U.S.C. 154(b) by 281 days.

(21) Appl. No.: 12/299,525

(22) PCT Filed: Apr. 30, 2007

(86) PCT No.: PCT/GB2007/001573
§ 371 (c)(1),
(2), (4) Date: Jun. 1, 2009

(87) PCT Pub. No.: WO2007/129030
PCT Pub. Date: Nov. 15, 2007

(65) Prior Publication Data
US 2009/0325037 A1    Dec. 31, 2009

(30) Foreign Application Priority Data
May 5, 2006  (GB) .................................. 0608894.2

(51) Int. Cl.
*H01M 2/18* (2006.01)
(52) U.S. Cl. .......................... 429/457; 429/458; 429/518
(58) Field of Classification Search .................. 429/544, 429/456–460, 518
See application file for complete search history.

(56) References Cited

U.S. PATENT DOCUMENTS

| | | | |
|---|---|---|---|
| 5,981,098 A | | 11/1999 | Vitale |
| 6,372,374 B1 * | | 4/2002 | Li et al. .......................... 429/470 |
| 6,602,626 B1 | | 8/2003 | Allen |
| 6,777,126 B1 | | 8/2004 | Allen |
| 7,390,586 B2 * | | 6/2008 | Gallagher et al. ............ 429/434 |
| 7,855,028 B2 * | | 12/2010 | Ryu et al. ...................... 429/457 |
| 2004/0106031 A1 | | 6/2004 | Sherman et al. |
| 2004/0137309 A1 * | | 7/2004 | Allen et al. ..................... 429/38 |
| 2005/0214627 A1 | | 9/2005 | Sugita et al. |

FOREIGN PATENT DOCUMENTS

| GB | 2 390 738 | 1/2004 |
|---|---|---|
| WO | 02/27815 | 4/2002 |

OTHER PUBLICATIONS

European Search Report for corresponding European Application No. 0608894.2, dated Aug. 30, 2006.
International Search Report of International Application No. PCT/GB2007/001573, filed Apr. 30, 2007; published in English as WO 2007/129030.

* cited by examiner

*Primary Examiner* — Tracy Dove
(74) *Attorney, Agent, or Firm* — Renner, Otto, Boisselle & Sklar, LLP

(57) ABSTRACT

A fluid flow field plate for use in a fuel cell, the plate comprising a first plurality of channels formed in a first surface thereof and extending across the first surface in a predetermined pattern, the plate having a folded region along a lateral edge, the folded region comprising a plenum and an interface region, the plenum having a longitudinal axis substantially parallel to an edge of the plate, the interface region comprising two adjacent and facing portions of the first surface.

14 Claims, 8 Drawing Sheets

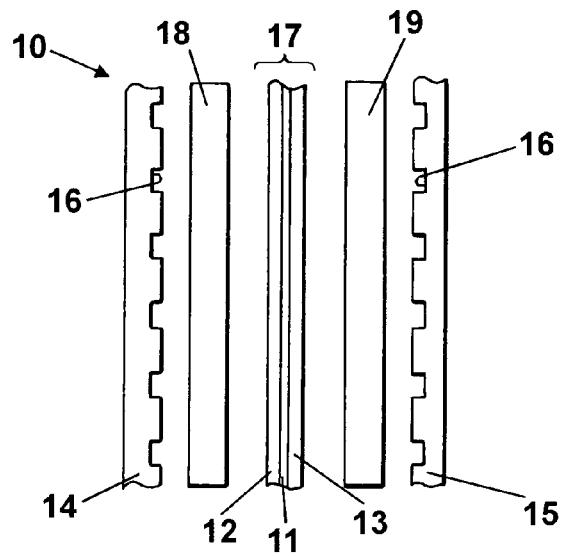
Fig. 1
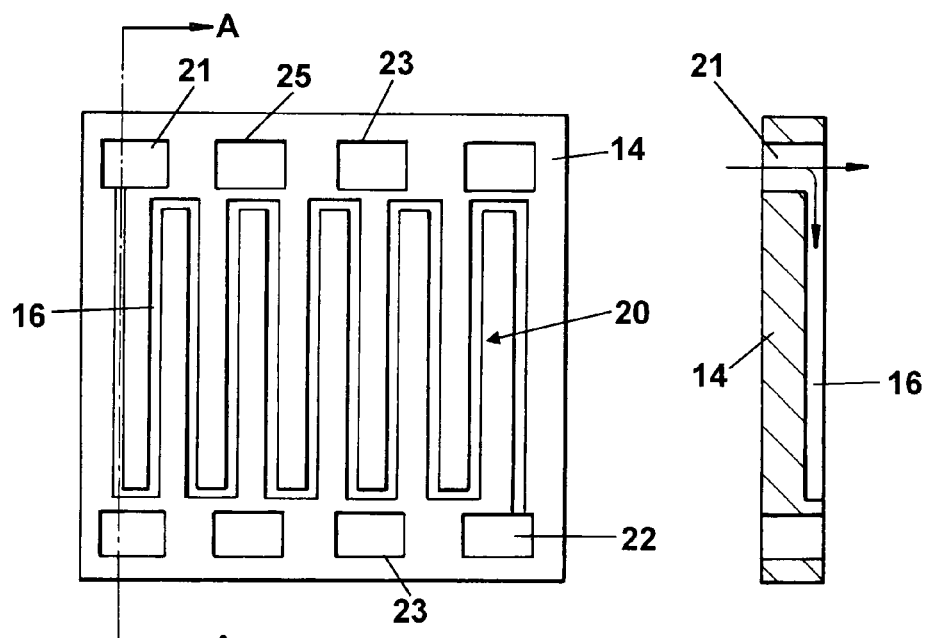 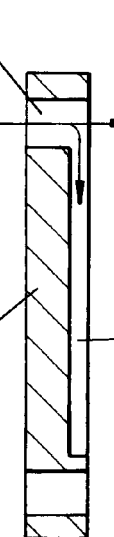
Fig. 2(a)   Fig. 2(b)

FUEL CELL FLUID DISTRIBUTION PLATES

This application is a national phase of International Application No. PCT/GB2007/001573 filed Apr. 30, 2008, and published in the English language under International Publication No. WO 2007/129030.

The present invention relates to fuel cells, and in particular to fluid flow field plates suitable for use in solid polymer electrolyte fuel cells, which plates act as fluid delivery conduits to electrode surfaces of the fuel cell.

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to collectively as the membrane-electrode assembly, or MEA 17.

Sandwiching the polymer membrane and porous electrode layers is an anode fluid flow field plate 14 and a cathode fluid flow field plate 15. Intermediate backing layers 18 and 19, also referred to here as diffuser layers, may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water.

The fluid flow field plates 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

With reference also to FIG. 2(a), one conventional configuration of fluid flow channel provides a serpentine structure 20 in a face of the anode 14 (or cathode 15) fluid flow field plate, having an inlet port 21 and an outlet port 22 as shown in FIG. 2(a). According to conventional design, it will be understood that the serpentine structure 20 comprises a channel 16 in the surface of the plate 14 (or 15), while the ports 21 and 22 each comprise an aperture through the plate so that fluid for delivery to, or exhaust from, the serpentine structure 20 can be communicated throughout the depth of a stack of plates in a direction orthogonal to the plate as particularly indicated by the arrow in the cross-section on A-A shown in FIG. 2(b).

With reference to FIG. 3, in a conventional fuel cell assembly 30, stacks of plates are built up. In this arrangement, adjacent anode and cathode fluid flow field plates are combined in conventional manner to form a single bipolar plate 31 having anode channels 32 on one face and cathode channels 33 on the opposite face, each adjacent to a respective membrane-electrode assembly (MBA) 34. The inlet port apertures 21 and outlet port apertures 22 are all overlaid to provide inlet and outlet manifolds to the entire stack. The various elements of the stack axe shown slightly separated for clarity, although it will be understood for the purposes of the present invention that they will be compressed together using sealing gaskets.

Other manifold apertures 23, 25 may be provided for fuel, oxidant, other fluids or exhaust communication to other channels in the plates, as for example shown in FIG. 2a.

The channels 16 in the fluid flow field plates 14, 15 may be open ended at both ends, i.e. the channels extending between an inlet port 21 and an outlet port 22 as shown, allowing a continuous throughput of fluid. This open ended arrangement is typically used for a combined oxidant supply and reactant exhaust. Alternatively, the channels 16 may be closed at one end, i.e. each channel has communication with only an input port 21 to supply fluid, relying entirely on 100% transfer of gaseous material into and out of the porous electrodes of the MEA. The closed channel may tropically be used to deliver hydrogen fuel to the MEA 11-13 in a comb type structure.

In order to obtain high and sustained power delivery capability from a fuel cell, it is generally necessary to maintain a high water content within the membrane-electrode assembly, and in particular within the membrane.

In the prior art, this is conventionally achieved by humidifying the feed gases, either fuel, air or both, fed via ports 21, 22 or 23 and channels 16. A disadvantage with this technique is that in order to maintain sufficient humidification levels, the inlet gas streams often require heating and supplementary apparatus to introduce water vapour into the flowing gas streams.

In the prior art, the supplementary apparatus has been implemented in a number of ways. Bubbling the fuel or oxidant gases through heated water columns prior to introduction into the fuel cell has been applied. Alternatively, permeable membranes have been utilised as water transfer media such that water is carried into a gas stream from an adjacent plenum containing liquid water. Wicks have similarly been adopted to act as water transport media, liquid to vapour phase.

The additional apparatus may be separate from, or form an integral part of, the fuel cell stack. In either case, there is an associated increase in size and complexity of the assembly as a whole.

An alternative method is to deliver water directly to the membrane 11, 34, e.g. directly to the electrode surfaces or into the channels 16 of the bipolar plates 31. This technique has the advantage of not only supplying the water to maintain a high membrane water content but also can act to cool the fuel cell through evaporation and extraction of latent heat of vaporisation.

This direct heat removal process that provides for the extraction of energy via the exit gas stream has distinct advantages associated with the elimination of intermediate cooling plates within the fuel cell stack assembler.

In the prior art, it is common to adopt a cooling regime which intersperses heat exchange plates between the electrochemically active plates so as to extract the thermal energy resulting from resistive and thermodynamic inefficiency of the fuel cell. These heat exchange, or cooling, plates utilise a recirculating or, less commonly, once-through fluid flow which carries heat away from the fuel cell stack. The cooling plates are in general of a different design to the active plates, and thereby add to the complexity, size and cost of the fuel cell assembly.

A difficulty that can be encountered in the direct introduction of water is to deliver precise quantities of water to the many fluid flow field plate channels 16 within a fuel cell stack 30. Typically, this requires the delivery of precise quantities of water to many thousands of individual locations. To achieve this, a complex design of fluid flow field plate 14, 15 or 31 is required, which is more difficult to achieve and which increases costs of production.

If the water delivery process is uneven then the cooling effect can be poorly distributed, resulting in localised hot spots where overheating may result in physical stress and a deterioration of the membrane 11 mechanical properties and ultimately rupture. This effect applies with both poor (uneven) delivery across a plate surface and uneven delivery to each of the individual cells that make up the stack. In other words, temperature variations may occur within a cell, or from cell to cell.

With reference to FIGS. 4(*a*) and 4(*b*), one prior art solution to the above mentioned problems provides a series of water injection conduits extending between a water inlet port 25 and the individual channels 16 of a fluid flow field plate 40*a* or 40*b*. Generally speaking, the water injection conduits are provided by way of a membrane or laminated structure which lies on the surface of the fluid flow field plate 40*a*, 40*b*. The water injection conduits are provided with inlets communicating with the water inlet manifold 25 and outlets which define predetermined water injection points over the channels 16 in the fluid flow field plate.

The laminated structure is generally provided in the form of two foil layers 41, 42 overlying the plate 40, the position of which foils are shown in dashed outline in FIGS. 4(*a*) and 4(*b*).

FIG. 4(*a*) illustrates a plan view of a fluid flow field plate 40*a* with serpentine channel 16, with foils 41*a*, 42*a* having first edges 43*a*, 44*a* coincident with the water inlet manifold 25, and second edges 45*a*, 46*a* located at or adjacent to predetermined water injection points 49 of the channels 16.

FIG. 4(*b*) illustrates a plan view of a fluid flow field plate 40*b* with two interdigitated comb channels 47, 48 each communicating with a respective manifold 21, 22, and foils 41*b*, 42*b* having first edges 43*b*, 44*b* coincident with the water inlet manifold 25, and second edges 45*b*, 46*b* located at or adjacent to predetermined water injection points of the channel 47.

The foil layer of the above prior art solution is an additional component to be incorporated into the assembly of the fuel cell. The component is necessarily thin (typically around 40 microns), so as to be sealable within a gasket region of the fuel cell. The water injection conduits formed within the foil layer are commonly formed by an etching process. In order to effectively deliver the water coolant to each of the channels across the fluid flow plate, the etched conduits need to be of uniform depth and of a complex, highly accurately produced, pattern. The combination of these factors result in an increase in cost and complexity of the fuel cell, and a potential difficulty with quality control of such finely engineered components.

It is an object of the present invention to allow for coolant distribution within a fuel cell with a reduced complexity.

According to a first aspect the invention provides for a fluid flow field plate for use in a fuel cell, the plate comprising a first plurality of channels formed in a first surface thereof and extending across the first surface in a predetermined pattern, the plate having a folded region along a lateral edge, the folded region comprising a plenum and an interface region, the plenum having a longitudinal axis substantially parallel to an edge of the plate, the interface region comprising two adjacent and facing portions of the first surface.

According to a second aspect, the invention provides a method of forming a fluid flow field plate for use in a fuel cell, comprising:

forming a first plurality of channels in a first surface of the plate, the channels extending across the surface in a predetermined pattern; and forming a folded region along a lateral edge of the plate, the folded region comprising a plenum and an interface region, the plenum having a longitudinal axis substantially parallel to an edge of the plate, the interface region comprising two adjacent and facing portions of the first surface.

Embodiments of the present invention will now be described by way of example and with reference to the accompanying drawings in which:

FIG. 1 shows a schematic cross-sectional view through a part of a conventional fuel cell;

FIGS. 2(*a*) and 2(*b*) respectively show a simplified plan and sectional view of a fluid flow field plate of the fuel cell of FIG. 1;

FIG. 4(*b*) shows a plan view of a fuel cell fluid flow field plate with interdigitated comb fluid conduit, showing in outline the overlay position of a water distribution foil and cover foil;

FIG. 5(*b*) shows a perspective view of part of the fluid flows field plate of FIG. 5(*a*) after a folding operation on the plate;

FIGS. 1 to 4 have already been described above in relation to prior art embodiments of fuel cell assemblies and components.

Figure 3:
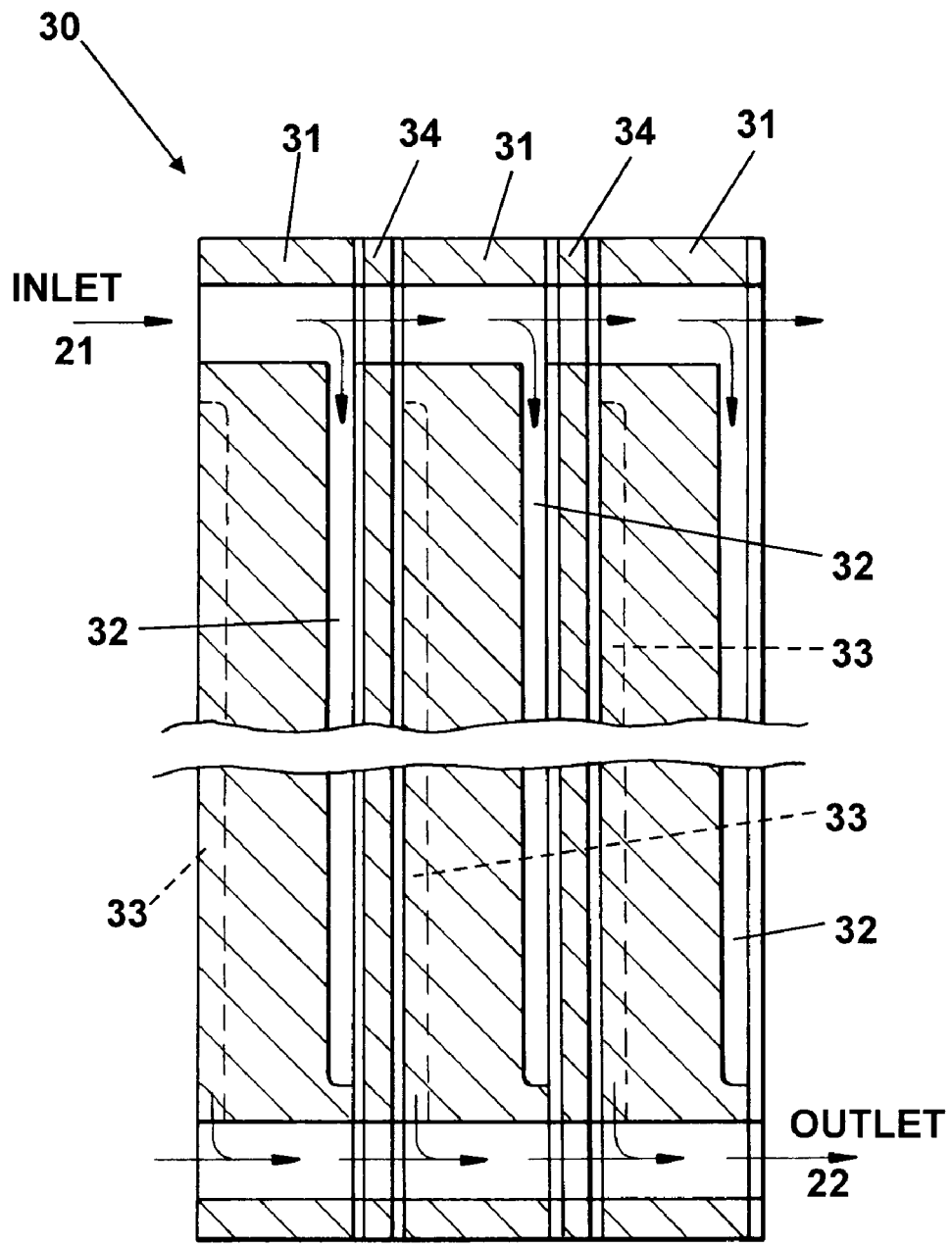
FIG. 3 shows a cross-sectional view through a conventional fuel cell stack with bipolar plates.
Figure 4A:
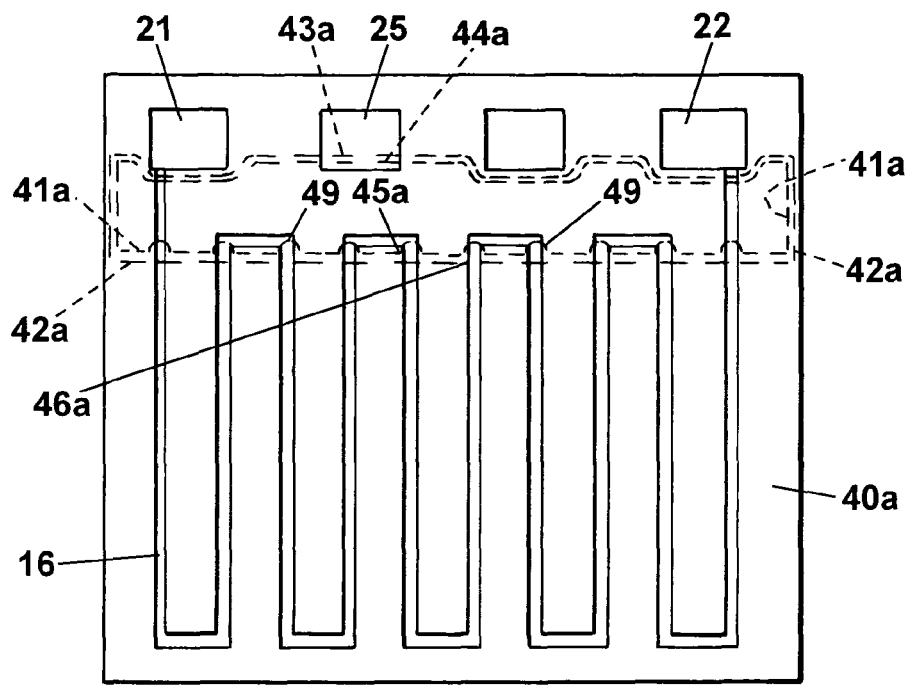
FIG. 4(*a*) shows a plan view of a fuel cell fluid flow field plate with a serpentine fluid conduit, showing in outline the overlay position of a water distribution foil and cover foil.
Figure 4B:
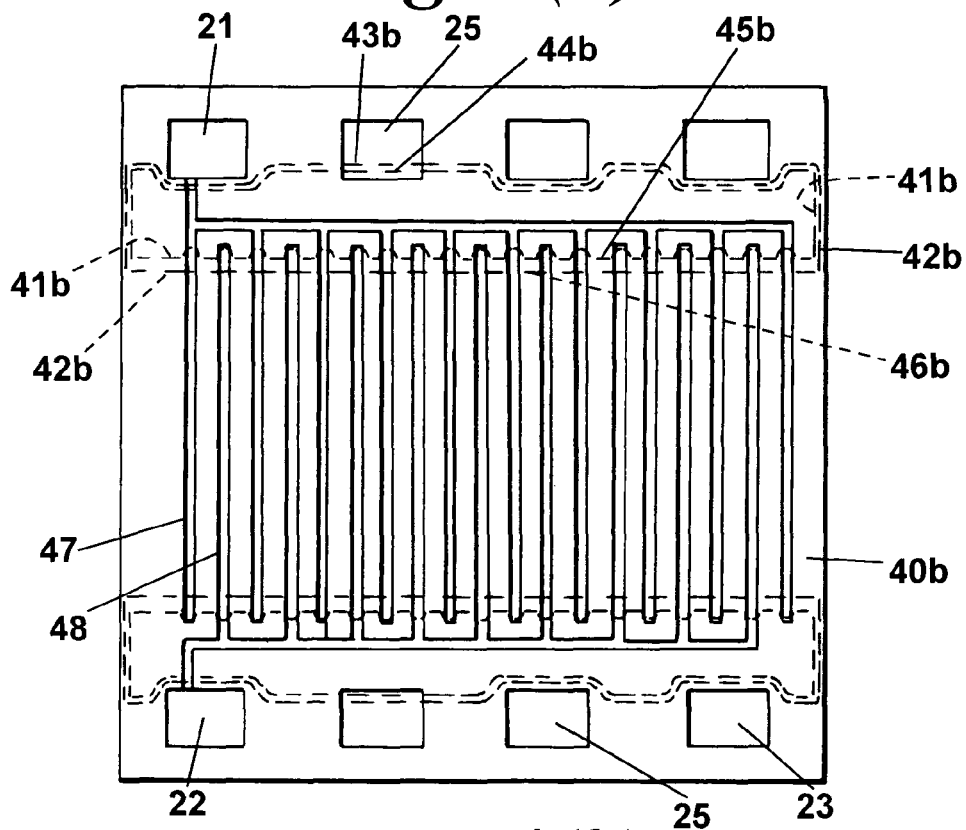
Figure 5A:
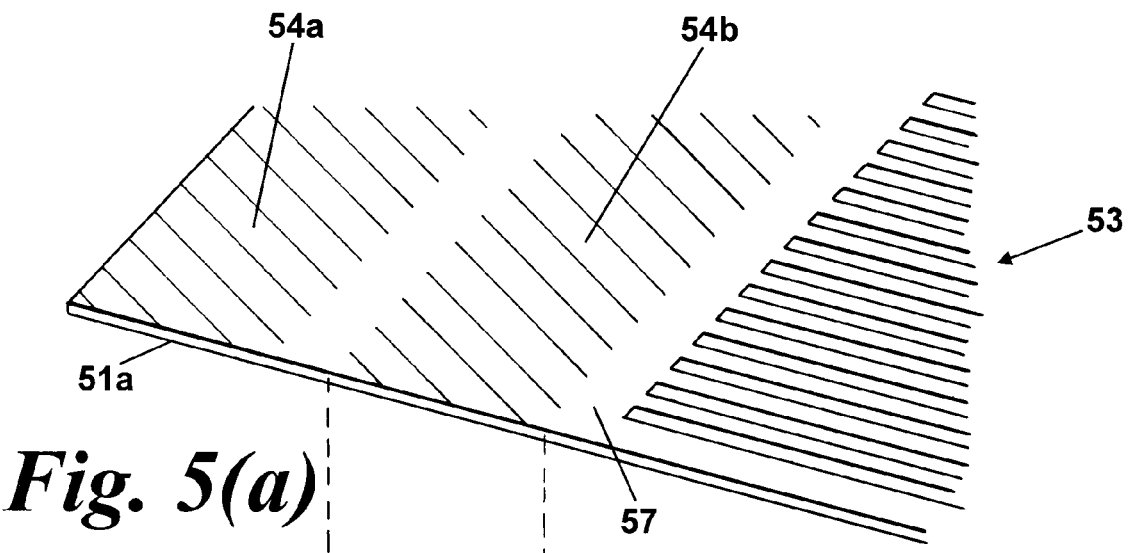
FIG. 5(*a*) shows a perspective view of part of a fluid flow field plate with channels formed in a first surface thereof.

Shown in FIG. 5*a* is a fluid flow field plate 51*a*, having a plurality of channels 53 provided on a first surface 57 thereof. First 54*a* and second 54*b* fold surfaces are provided on the first surface 57. One or both of the fold surfaces 54*a*, 54*b* may be provided with a surface texture. The surface texture (the function of which will be described later) may be formed by, for example, abrading, etching or embossing one or both of the fold surfaces 54*a*, 54*b*.

Figure 5B:
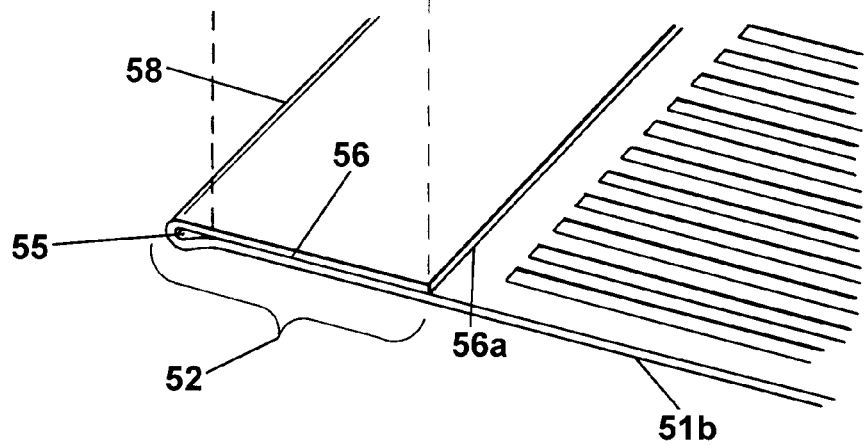

The fluid flow plate 51*a* of FIG. 5*a*, when subjected to a folding operation, transforms into a folded fluid flow field plate 51*b* as shown in FIG. 5*b*, in which a folded region 52 is now formed in the plate 51*b*. The folded region 52 comprises a plenum 55 having a longitudinal axis extending parallel to an edge 58 of the plate 51*b* and an interface region 56 formed by the fold surfaces 54*a*, 54*b* being adjacent and facing each other in close proximity. The interface region forms a fluid connection extending from the plenum towards the channels 53 on the first surface 57. Fuel or oxidant fluids may be provided to the channels 53 via ports along an edge of the fluid flow plate 51*a* opposite the folded region. Alternatively, fuel or oxidant may be provided via one or more fluid distribution features within one or more other components such as a gasket or distribution manifold sealed against the surface 57.

Preferably, the interface region 56 extends towards the channels 53, such that coolant passing along the interface region 56 exits at an outlet edge 56a and enters the channels 53 provided proximate thereto. The outlet edge 56a may optionally be provided such that the coolant exits the interface region directly into the channels, for example by the fold surface 54a partially overlying the channels 53 or a selected number thereof by suitable shaping of the edge 56a. The outlet edge 56a may, for example, be scalloped or otherwise shaped in order to promote water concentration points corresponding to the channels 53. For example, such shaping could be in the same manner as the edge 46b (FIG. 4b) of an equivalent foil. Other components such as a diffuser layer positioned proximate the surface 57 may provide the function of distributing the coolant from the outlet edge 56a of the interface region to the channels.

Figure 6:
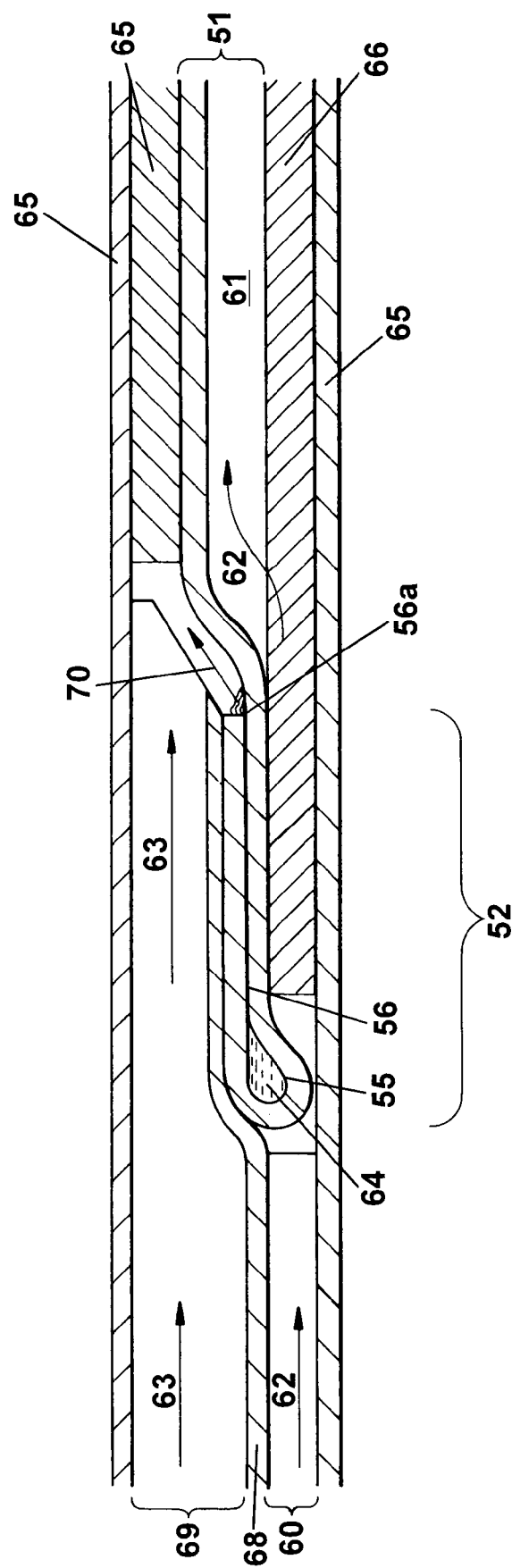
FIG. 6 shows a schematic cross-section through the folded fluid flow field plate of FIG. 5.

Shown in FIG. 6 is a cross-sectional view of part of a fluid flow field plate 51, in the form of a bipolar plate, i.e. having an anode side 60 and a cathode side 69. In this case the cathode channels 53 (not shown in FIG. 6) and anode channels 61 are formed in the plate 51 through a plastic forming process such as embossing of a metal plate blank. In the section, an anode fluid flow channel 61 is shown, through which fuel flows, indicated by arrows 62. Oxidant flow along the cathode side 69 is indicated by arrows 63. The fuel flow 62 and oxidant flow 63 may be within open cell regions of a compressible gasket, as described for example in UK Patent Application No. 0601986.3. The anode side 60 and cathode side 69 are fluidly sealed from one another by the bipolar plate 51 and a gasket 68. An anode diffuser layer 66 is provided on the anode side 60 of the plate 51, and a cathode diffuser layer 65 is provided on the cathode side 69. MEAs 65 are situated on either side. The assembly is repeated with similar units to make up a fuel cell stack.

The folded region 52 of the plate 51 comprises a plenum 55 and an interface region 56. Shown within the plenum 55 is a coolant 64, which is preferably water. The coolant 64 passes from the plenum through the interface region 56 and flows out of the interface region on the cathode side 69 along the interface region outlet edge 56a, in a direction indicated bit arrow 70. The coolant then flows through the cathode diffuser layer 65 and along the cathode side fluid flow channels 53 (indicated on FIG. 5a). Cooling of the plate 1 is preferably enhanced through evaporation of the coolant within the cathode side 69. The coolant then exits the fuel cell along with the oxidant feed and exhaust gas, extracting heat from the fuel cell.

The interface region 56 preferably comprises a plurality of conduits distributed across one or both of the fold surfaces 54a, 54b. These conduits may be engineered through various means, one of the simplest being a predetermined level of surface roughness applied to one or both of the surfaces 54a, 54b to provide a textured surface. When the fold surfaces 54a, 54b meet, an interconnected network of conduits is provided between the peaks of the surface features of the surfaces. The conduits are preferably of an average cross-sectional dimension (typically around 25 microns or smaller, and more preferably 5 microns or smaller) that provides a sufficient pressure drop across the interface region extending between the plenum 55 and the cathode channels 53. An even distribution of coolant may thereby be enabled across the channels 53, minimising the pressure drop along the length of the plenum 55. The interface region thereby forms a metering interface that provides a resistance to water flow, back-pressuring the water supply and ensuring even distribution across the width of the plate 51.

The metering interface function of the interface region 56 may alternatively be provided by embossing, micro-etching, sand-blasting or any other suitable surface forming or abrasive process. It is also possible for a porous medium to be entrapped between the folded surfaces 54a, 54b such that the metering function is performed by this medium. Suitable porous media may include paper, cloth or expanded polytetrafluoroethene (PTFE).

Figure 7:
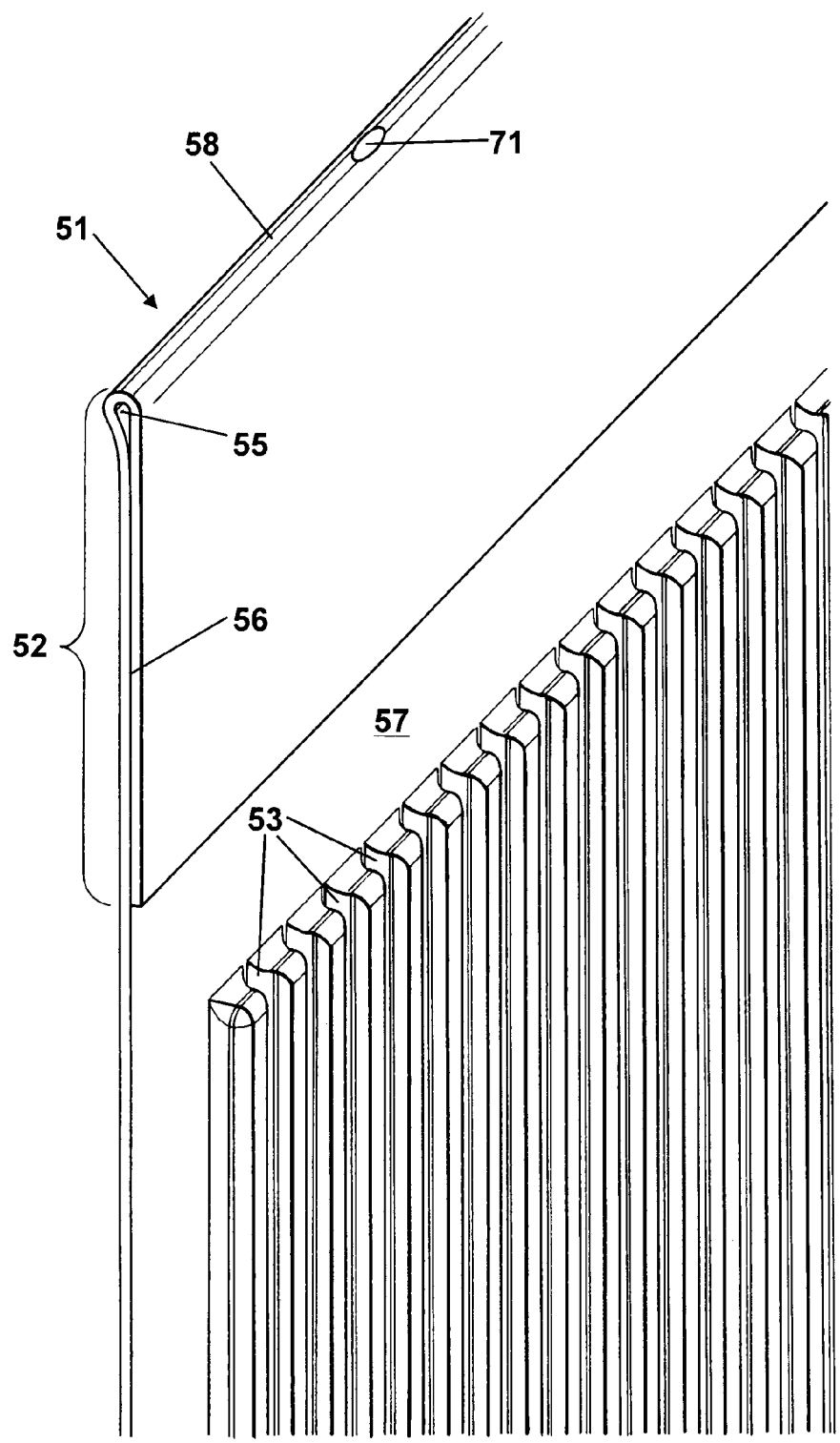
FIG. 7 shows an isometric view of part of a folded fluid flow field plate.

Shown in FIG. 7 is an isometric view of part of a fluid flow field plate 51, within which a folded region 52 is formed, comprising a plenum 55 and an interface region 56. Channels 53 are formed in a first surface 57 of the plate 51 through embossing of the plate. One or more holes 71 may be provided in a folded edge 58 of the plate 51 to allow entry of coolant fluid into the plenum 55, the hole 71 extending from an outer surface of the folded region 52 to the plenum 55.

Figure 8:
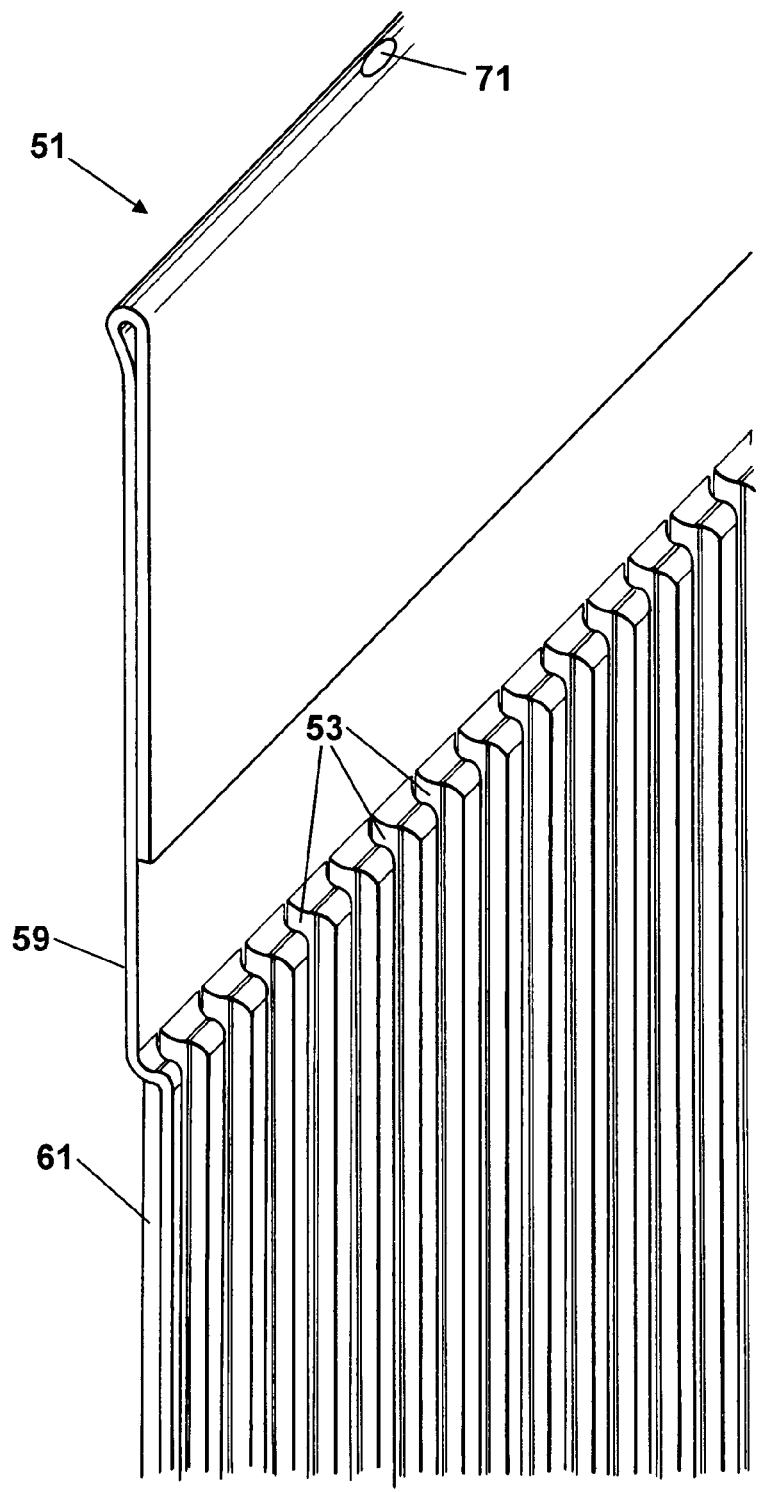
FIG. 8 shows an isometric view of a sectioned part of a folded fluid flow field plate.

A section through the plate 51 of FIG. 7 is shown in FIG. 8, where an anode channel 61 is shown on the second surface 59 of the plate 51, corresponding to the anode side 60 of FIG. 6.

The plenum 55 within the folded region 52 is preferably sealed at both ends before or during assembly into a fuel cell stack. Sealing may be effected, for example, by means of a plug formed of a moulded elastomeric compound, which may be a discrete component. A seal may alternatively be formed by crimping the side edges of the plate 51 together or through compressive deformation of a sealing gasket around the edges of the plate 51.

Figure 9:
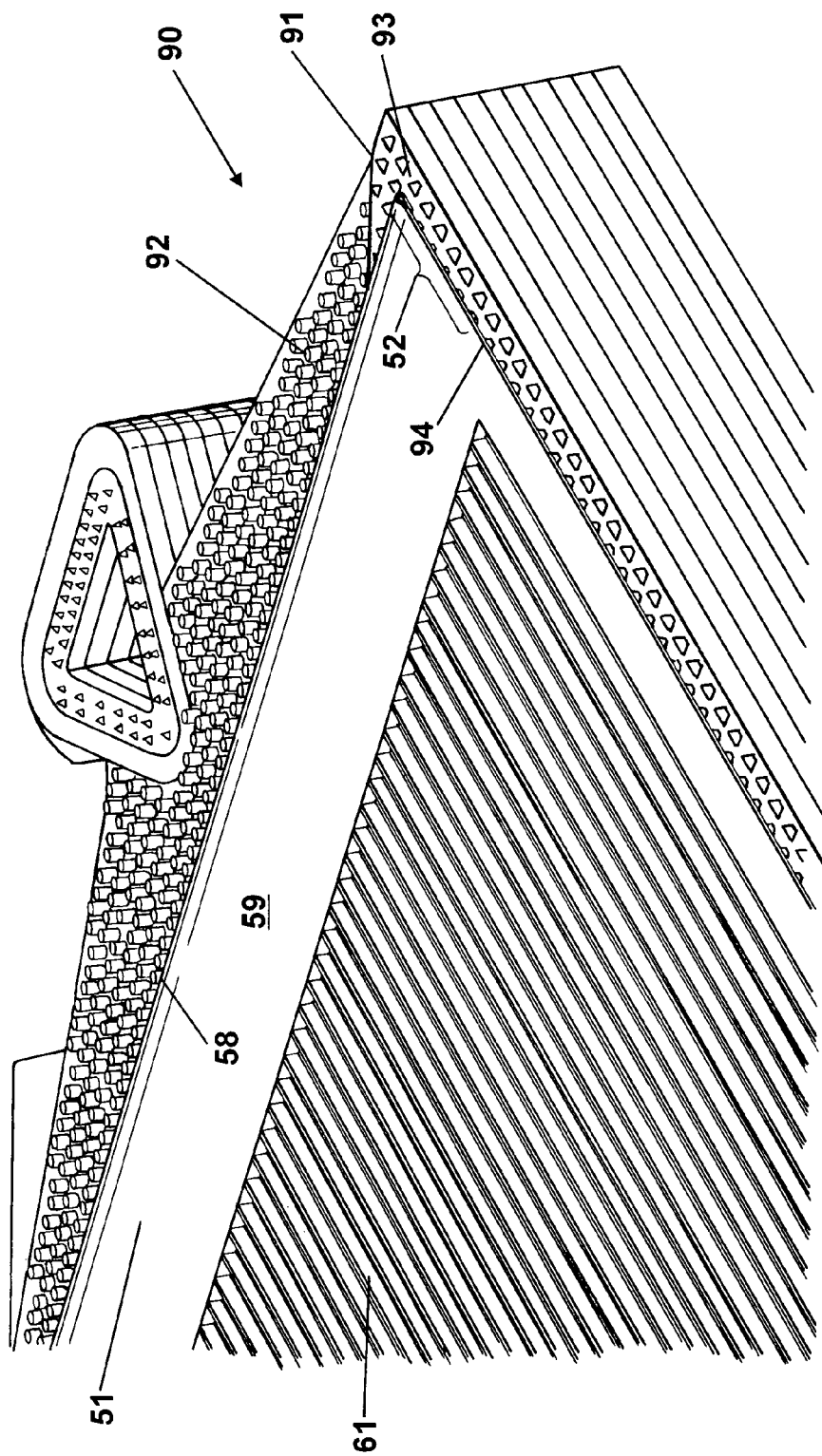
FIG. 9 shows an isometric view of part of a partially assembled fuel cell stack comprising a folded fluid flow field plate.

Shown in FIG. 9 is an isometric view of part of a plate 51 in a partially assembled fuel cell stack 90. The bipolar fluid flow field plate 51 is shown with the second surface 59 face up, showing the anode side channels 61. A gasket 91 surrounds the edges of the plate 51. The gasket 91 comprises a plurality of cavities extending partially through the thickness of the gasket, the cavities being formed into open cell regions 92 and closed cell regions 93. The gasket may be provided in accordance with the teachings of UK Patent Application No. 0601986.3. The open cell regions 92 comprise interconnected cavities such that fluid can pass along the surface of the gasket. The closed cell regions 93 comprise cavities that are isolated from each other, and so fluid flow is prevented across the surface of the gasket. The side edge 94 of the plate 51 is sealed against a closed cell region 93 of the gasket 91, thus sealing the edge of the folded region 52 comprising the plenum 55 and interface region 56. The folded edge 58 of the plate 51, however, is at least partially within an open cell region 92 of the gasket, thus allowing fluid flow to the edge 58. With one or more holes 71 (shown in FIGS. 7 and 8) provided in the folded edge 58, coolant can be directed into the plenum 55 via the open cell region 92 of the gasket 91. The coolant may alternatively or additionally be directed toward one or both of the open ends of the plenum, through an appropriate modification to the arrangement of open and closed cell regions in the gasket 91.

It is to be understood that references to cooling of the cathode side of a fluid flow field plate of the invention are not intended to limit the invention only to cathode cooling. Fluid flow field plates of the invention may also comprise anode cooling, with appropriate modifications Other embodiments are envisaged to be within the scope of the intention as defined by the appended claims.

The invention claimed is:

1. A fluid flow field plate for use in a fuel cell, the plate comprising a first plurality of channels formed in a first surface thereof and extending across the first surface in a predetermined pattern, the plate having a folded region along a lateral edge, the folded region comprising a plenum and an interface region, the plenum having a longitudinal axis substantially parallel to an edge of the plate, the interface region comprising two adjacent and facing portions of the first surface.

2. The fluid flow field plate of claim 1 in which a second plurality of channels is formed in a second surface thereof.

3. The fluid flow field plate of claim 1 in which the plenum extends from a first edge of the plate to a second opposing edge.

4. The fluid flow field plate of claim 1 in which the interface region comprises a plurality of conduits extending from the plenum towards the first plurality of channels.

5. The fluid flow field plate of claim 4 in which the plurality of conduits are provided by embossed, etched or abraded regions within adjacent and facing portions of the first surface.

6. The fluid flow field plate of claim 4 in which the plurality of conduits are provided by a porous medium interposed between the adjacent and facing portions of the first surface.

7. The fluid flow field plate of claim 6 in which the porous medium is of a material selected from the group consisting of paper, cloth and expanded PTFE.

8. The fluid flow field plate of claim 1 in which a hole is provided extending from an outer surface of the folded region to the plenum.

9. The fluid flow field plate of claim 3 in which the plenum is sealed at the first and second edges by fluid seals.

10. The fluid flow field plate of claim 9 in which the fluid seals are provided by crimped portions of the plate.

11. The fluid flow field plate of claim 9 in which the fluid seals are provided by one or more sealing components within the plenum.

12. A fuel cell assembly comprising:
   the fluid flow field plate of claim 1;
   a membrane-electrode assembly; and
   a diffuser layer in fluid communication with the first plurality of channels in the fluid flow field plate and interposed between the first surface of the fluid flow plate and the membrane-electrode assembly,
   wherein an outlet edge of the interface region of the fluid flow field plate is in fluid communication with the diffuser layer.

13. A method of forming a fluid flow field plate for use in a fuel cell, comprising:
   forming a first plurality of channels in a first surface of the plate, the first plurality of channels extending across the first surface in a predetermined pattern; and
   forming a folded region along a lateral edge of the plate, the folded region comprising a plenum and an interface region,
   the plenum having a longitudinal axis substantially parallel to an edge of the plate, the interface region comprising two adjacent and facing portions of the first surface.

14. The method of claim 13 further comprising providing a porous medium interposed between the adjacent and facing portions of the first surface.

* * * * *